US009550851B2

(12) United States Patent
Barner-Kowollik et al.

(10) Patent No.: US 9,550,851 B2
(45) Date of Patent: Jan. 24, 2017

(54) FUNCTIONAL MATERIALS WITH REVERSIBLE CROSSLINKING

(71) Applicants: Christopher Barner-Kowollik, Stutensee (DE); Kim Klaus Oehlenschlaeger, Hockenheim (DE); Stefan Hilf, Singapore (SG); Friedrich Georg Schmidt, Haltern am See (DE); Nathalie Guimard, Zurich (CH); Jan Mueller, Lorsch (DE)

(72) Inventors: Christopher Barner-Kowollik, Stutensee (DE); Kim Klaus Oehlenschlaeger, Hockenheim (DE); Stefan Hilf, Singapore (SG); Friedrich Georg Schmidt, Haltern am See (DE); Nathalie Guimard, Zurich (CH); Jan Mueller, Lorsch (DE)

(73) Assignee: EVONIK ROEHM GmbH, Darmstadt (DE)

( * ) Notice: Subject to any disclaimer, the term of this patent is extended or adjusted under 35 U.S.C. 154(b) by 0 days.

(21) Appl. No.: 14/651,317

(22) PCT Filed: Nov. 11, 2013

(86) PCT No.: PCT/EP2013/073477
§ 371 (c)(1),
(2) Date: Jun. 11, 2015

(87) PCT Pub. No.: WO2014/090492
PCT Pub. Date: Jun. 19, 2014

(65) Prior Publication Data
US 2015/0299363 A1  Oct. 22, 2015

(30) Foreign Application Priority Data

Dec. 11, 2012 (DE) .................. 10 2012 222 742

(51) Int. Cl.
| | | |
|---|---|---|
| C09J 133/14 | (2006.01) | |
| C09J 141/00 | (2006.01) | |
| C09J 147/00 | (2006.01) | |
| C09D 133/14 | (2006.01) | |
| C09D 141/00 | (2006.01) | |
| C09D 147/00 | (2006.01) | |
| C09D 11/00 | (2014.01) | |
| C08F 236/22 | (2006.01) | |
| C09D 4/00 | (2006.01) | |
| C09J 4/00 | (2006.01) | |
| C08F 220/10 | (2006.01) | |
| C08F 220/28 | (2006.01) | |
| C08F 234/04 | (2006.01) | |
| C09D 133/08 | (2006.01) | |
| C09J 133/08 | (2006.01) | |

(52) U.S. Cl.
CPC .......... *C08F 236/22* (2013.01); *C08F 220/10* (2013.01); *C08F 220/28* (2013.01); *C08F 234/04* (2013.01); *C09D 4/00* (2013.01); *C09D 11/00* (2013.01); *C09D 133/08* (2013.01); *C09D 133/14* (2013.01); *C09D 141/00* (2013.01); *C09D 147/00* (2013.01); *C09J 4/00* (2013.01); *C09J 133/08* (2013.01); *C09J 133/14* (2013.01); *C09J 141/00* (2013.01); *C09J 147/00* (2013.01); *C08F 2220/281* (2013.01)

(58) Field of Classification Search
None
See application file for complete search history.

(56) References Cited

U.S. PATENT DOCUMENTS

| | | | |
|---|---|---|---|
| 8,916,635 B2 | 12/2014 | Schmidt et al. | |
| 8,969,467 B2 | 3/2015 | Hilf et al. | |
| 8,980,999 B2 | 3/2015 | Schmidt et al. | |
| 8,981,010 B2 | 3/2015 | Schmidt et al. | |
| 8,987,380 B2 | 3/2015 | Hilf et al. | |
| 2012/0309895 A1* | 12/2012 | Schmidt | C09J 4/00 524/599 |

(Continued)

FOREIGN PATENT DOCUMENTS

| | | | |
|---|---|---|---|
| DE | 10 2010 001 987 A1 | 8/2011 | |
| DE | 10 2010 040 282 A1 | 3/2012 | |
| DE | 10 2010 044 025 A1 | 5/2012 | |

OTHER PUBLICATIONS

Oehlenschlaeger et al. (Polym. Chem., 2013, 4, 4348-4355).*
International Search Report issued Feb. 20, 2014, in PCT/EP2013/073477, filed Nov. 11, 2013.

*Primary Examiner* — Vu A Nguyen
(74) *Attorney, Agent, or Firm* — Oblon, McClelland, Maier & Neustadt, L.L.P.

(57) ABSTRACT

A method for the reversible crosslinking of, for example, adhesives or coating materials, and a composition stable on storage at room temperature for implementing the crosslinking reaction. The reversible crosslinking method allows very rapid crosslinking even at a low first temperature, and undoing of the crosslinks at higher temperatures, thereby recovering thermoplastic processability and, for example, allowing the originally bonded substrates to be parted from one another again easily. A particular aspect is that a plurality of cycles of crosslinking and undoing of the crosslinks are possible with the present system. A feature of the system used for the reversible crosslinking is that it contains two components, A and B, where component A is a compound having at least two protected dithioester functionalities, preferably cyanodithioester functionalities, and component B is a compound having at least two diene functionalities.

13 Claims, No Drawings

(56) References Cited

U.S. PATENT DOCUMENTS

2013/0172480 A1 7/2013 Schmidt et al.
2013/0303678 A1 11/2013 Hilf et al.
2014/0163165 A1 6/2014 Schmidt et al.
2014/0323001 A1 10/2014 Schmidt et al.
2014/0323648 A1 10/2014 Schmidt et al.

* cited by examiner

FUNCTIONAL MATERIALS WITH REVERSIBLE CROSSLINKING

FIELD OF THE INVENTION

The present invention relates to an innovative method for the reversible crosslinking of, for example, adhesives or coating materials, and to a composition stable on storage at room temperature for implementing this crosslinking reaction.

The reversible crosslinking method allows very rapid crosslinking even at a low first temperature, and undoing of the crosslinks at higher temperatures, thereby recovering thermoplastic processability and, for example, allowing the originally bonded substrates to be parted from one another again easily. A particular aspect here is that a plurality of cycles of crosslinking and undoing of the crosslinks are possible with the present system. A feature of the system used for the reversible crosslinking is that it consists of two components, A and B, in which component A is a compound comprising at least two protected dithioester functionalities, preferably cyanodithioester functionalities, and component B is a compound having at least two diene functionalities.

PRIOR ART

Methods for the reversible crosslinking of polymers are of great interest for a broad field of applications. In adhesive applications, for example, diverse possibilities for the automotive industry or the semiconductors industry are described. In the context of the construction of machines, precision mechanical devices, or in the building industry as well, however, such adhesives are of interest.

Besides adhesive applications, reversibly crosslinkable polymers may also be of interest in sealants, in coating materials such as varnishes or paints, or in the production of mouldings.

DE 198 32 629 and DE 199 61 940 describe processes where epoxy-, urea-, (meth)acrylate- or isocyanate-based adhesives are thermally decomposed. For this purpose, the adhesive formulation from DE 199 61 940 comprises a thermally unstable substance which is activated on heating. The adhesive layer in DE 198 32 629 is destroyed by a particularly high energy input. In both cases, deactivation of the adhesive layer is irreversible.

US 2005/0159521 and US 2009/0090461 describe an adhesive system which is crosslinked radically by exposure to actinic radiation and is destroyed by ultrasound. This process too, irreversibly, can no longer be implemented after one bonding cycle.

In EP 2 062 926, thermally labile, sterically hindered urea groups are incorporated in the chains of a polyurethane for adhesive applications; introduction of thermal energy causes destruction of these groups, thereby reducing the adhesive bonding effect sufficiently to part the bond.

US 2009/0280330 describes an adhesive system which can apparently be used more than once and which has a two-layer construction. One layer is a shape memory layer, which may be thermally flexible or cured. The other layer is a dry adhesive, having different adhesive strengths as a function of its structure. Problems of such a system, however, are the two-layer structure, which is laborious to construct, and the anticipated residual tack after heating of the shape memory layer.

For a number of years, primarily within academia, methods for constructing block polymers have been researched under the generic heading of "Click Chemistry". In this chemistry, two different homopolymers with linkable end groups are combined with one another and are joined to one another by means, for example, of a Diels-Alder reaction, Diels-Alder-analogous reaction or other cycloaddition. The objective of this reaction is to construct thermally stable, linear and possibly high molecular mass polymer chains. Inglis et al. (Macromolecules 2010, 43, pp. 33-36), for example, describe, for this purpose, polymers with cyclopentadienyl end groups which are obtainable from polymers prepared by means of ATRP. These cyclopentadiene groups are able to react very rapidly in hetero-Diels-Alder reactions with polymers which carry electron-deficient dithioesters as end groups (Inglis et al., Angew. Chem. Int. Ed. 2009, 48, pp. 2411-2414).

The use of monofunctional RAFT polymers for linking with monofunctional polymers having a dihydrothiopyran group by way of a hetero-Diels-Alder reaction is found in Sinnwell et al. (Chem. Comm. 2008, 2052-2054). This method can be used to realize AB diblock copolymers. Rapid variants of this hetero-Diels-Alder linkage for synthesis of AB block copolymers with a dithioester group which is present after a RAFT polymerization and with a dienyl end group are described in Inglis et al. (Angew. Chem. Int. Ed. 2009, 48, pp. 2411-14) and in Inglis et al. (Macromol. Rapid Commun. 2009, 30, pp. 1792-98). The analogous preparation of multiarm star polymers is found in Sinnwell et al. (J. Pol. Sci.: Part A: Pol. Chem. 2009, 47, pp. 2207-13).

U.S. Pat. No. 6,933,361 describes a system for producing transparent mouldings that can be repaired simply. The system is composed of two polyfunctional monomers which polymerize by means of a Diels-Alder reaction to form a high-density network. One functionality in this system is a maleimide, and the other functionality is a furan. The thermal switching of a high-density network of this kind is used for its repair. Crosslinking takes place at temperatures above 100° C., the partial reverse reaction at even higher temperatures.

In Syrett et al. (Polym. Chem. 2010, DOI: 10.1039/b9py00316a) star polymers are described for use as flow improvers in oils. These polymers have self-healing properties that can be controlled by means of a reversible Diels-Alder reaction. For this purpose, monofunctional polymethacrylate arms are combined with polymethacrylates which in the middle of the chain, as a fragment of the initiator used, possess a group which can be used in a reversible Diels-Alder reaction.

EP 2 536 797 discloses a reversibly crosslinking system of two components A and B. In this system, component A is a compound having at least two dienophilic groups, and component B is a compound having at least two diene functionalities. In terms of the maximum number of possible switching cycles and the stability of the compositions in storage, the combinations of components A and B that are disclosed in EP 2 536 797 are certainly amenable to further optimization.

OBJECT

An object of the present invention is to provide an improved reversible crosslinking method based on the combination of compounds having at least two dienophilic groups and at least two dienes. This crosslinking method is to be amenable to use in different applications and across a broad formulation spectrum.

A further object here is that the components used for crosslinking, even in a preformulated mixture of all of the components, are particularly stable in storage and are easy to activate thermally.

A particular object is to provide a reversible crosslinking method which can be switched a number of times, i.e. at least five times, without substantial loss of properties.

Furthermore, the object exists of providing a reversible crosslinking method which can be activated very rapidly at low temperatures and can be deactivated again under conditions which are benign for the formulation and for any coated substrates.

Further objects, not stated explicitly, will become apparent from the overall context of the description, claims and examples hereinbelow.

Solution

The objects have been achieved through development of an innovative reversible crosslinking mechanism which can be used for different kinds of polymers independently of the formulating constituents such as binders. With the mechanism, new, reversibly crosslinkable formulations are also provided. Surprisingly it has been found that the stated objects can be achieved by means of a formulation which is crosslinkable by means of a Diels-Alder or hetero-Diels-Alder reaction. Features of this formulation include its stability on storage at room temperature without crosslinking, its reaction with crosslinking at a temperature $T_1$, and the undoing of at least 80% of the crosslinking points at a temperature $T_2$ which is higher than $T_1$.

The formulations of the invention comprise a component A, which has at least two dienophilic double bonds, and a component B, which has at least two diene functionalities. For a crosslinking system, at least one of these two components, A or B, must have more than two, preferably at least three, of the respective functionalities. A system having two functional groups in each of components A and B does not react with crosslinking. However, a system of this kind is also of economic interest, since with such a composition, for example, the viscosity can be selectively controlled as a function of temperature.

Preferably at least one of the components, A or B, is present in the form of a polymer. In crosslinking systems, for example, the component having at least three functionalities may be a polymer, and the component having two functionalities may be a low molecular mass substance or an oligomer. In an alternative embodiment, the component having at least three functionalities is an oligomer or low molecular mass substance, and the component having two functionalities is a polymer. In a third, alternative embodiment, both components are polymers. In further alternative embodiments, both components have at least three functionalities, irrespective of which of the two components is a polymer. In another embodiment both components are polymers having at least three functionalities.

Where the components A and B are each a polymer, these polymers may be different polymers or the same polymers differing only with respect to the functional groups.

The polymers may be polyacrylates, polymethacrylates, polystyrenes, copolymers of acrylates, methacrylates and/or styrenes, polyacrylonitrile, polyethers, polyesters, polylactic acids, polyamides, polyesteramides, polyurethanes, polycarbonates, amorphous or semicrystalline poly-α-olefins, EPDM, EPM, hydrogenated or unhydrogenated polybutadienes, ABS, SBR, polysiloxanes and/or block, comb and/or star copolymers of these polymers. These star polymers may have more than 30 arms. The composition of the arms may vary and may be composed of different polymers. It is also possible for these arms in turn to have branching sites. The comb polymers may have a block structure and also variable comb arms.

The (meth)acrylates notation used below stands for alkyl esters of acrylic acid and/or of methacrylic acid.

A particular aspect of the invention is that the formulation is crosslinkable at room temperature and the crosslinking can be reversed at a higher temperature to an extent such as to produce a liquid, ungelled material which can be reshaped by means, for example, of processes customary in the processing of thermoplastics.

The dienophile, in accordance with the invention, is a protected dithioester, and hence the crosslinking reaction is a hetero-Diels-Alder reaction. The parent dithioester of the dienophilic component used in accordance with the invention therefore has the structure

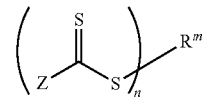

where Z is a strongly electron-withdrawing group, $R^m$ is a plurivalent organic group, preferably based on branched or linear alkylic, aromatic, or a combination of alkylic and aromatic polyfunctional alcohols, polyfunctional halogenated compounds, polyfunctional carboxylic acids or polyfunctional amines. Alternatively $R^m$ may also be a polymer. The number of the dithioester groups, n, is a number between 2 and 20, preferably between 2 and 10 and more preferably between 2 and 4.

In one preferred embodiment the group Z is a 2-pyridyl group, a phosphoryl group, a sulphonyl group, or a cyano or trifluoromethyl group. In addition to the preferred groups, suitability is possessed by any other group Z which very greatly reduces the electron density of the C=S double bond and hence allows a rapid Diels-Alder reaction. With particular preference Z is a cyano group.

The protected dithioester employed as a dienophile in accordance with the invention is more particularly a cyclopentadiene-protected dithioester and hence a compound having the following structure:

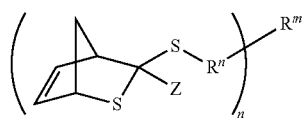

Here, the number of the groups, n, and $R^m$, are governed by the same statements as made above for the dithioesters. $R^n$ in turn is a coupling group by means of which the protected dithioester group is coupled to $R^m$. One example of such a group is a benzyl radical. For example, however, divalent alkyl radicals having up to 10 carbon atoms, other divalent aromatic radicals, or divalent oligoether radicals may also be used. A compound with cyclopentadienyl-protected cyanodithioesters with benzyl coupling groups, accordingly, has the following appearance:

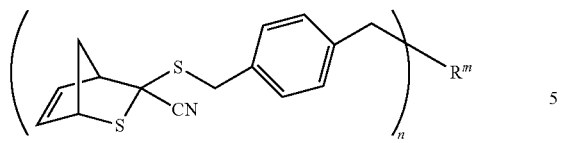

One example of a difunctional crosslinker is the compound below, which is prepared from the reaction of isophorone diisocyanate and the cyclopentadiene-protected crosslinker:

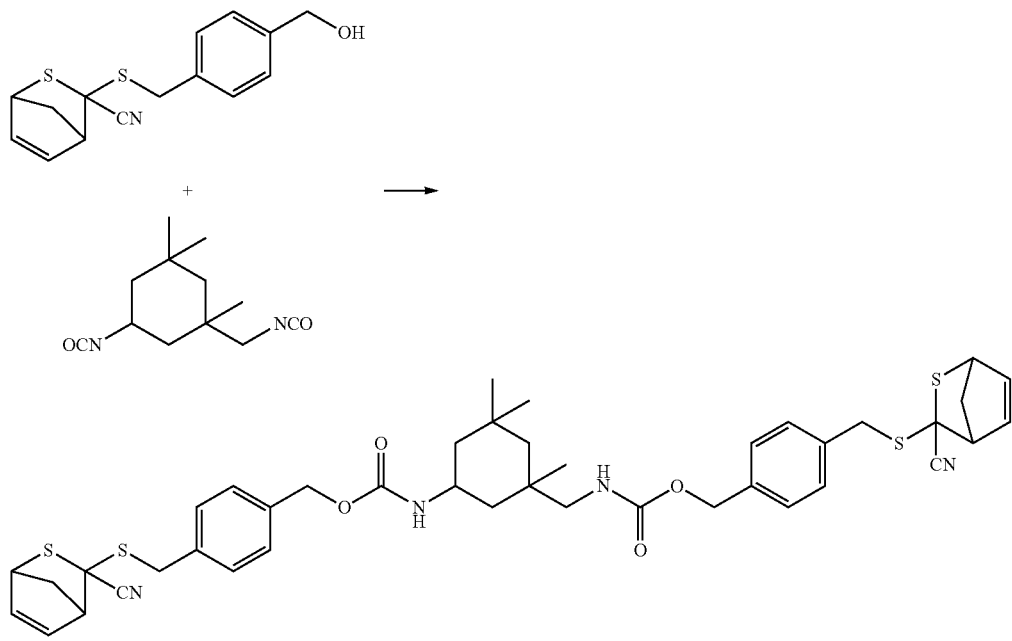

One example of a trifunctional crosslinker is the following compound, which is prepared from the reaction of the trimer of hexamethylene diisocyanate and the cyclopentadiene-protected crosslinker:

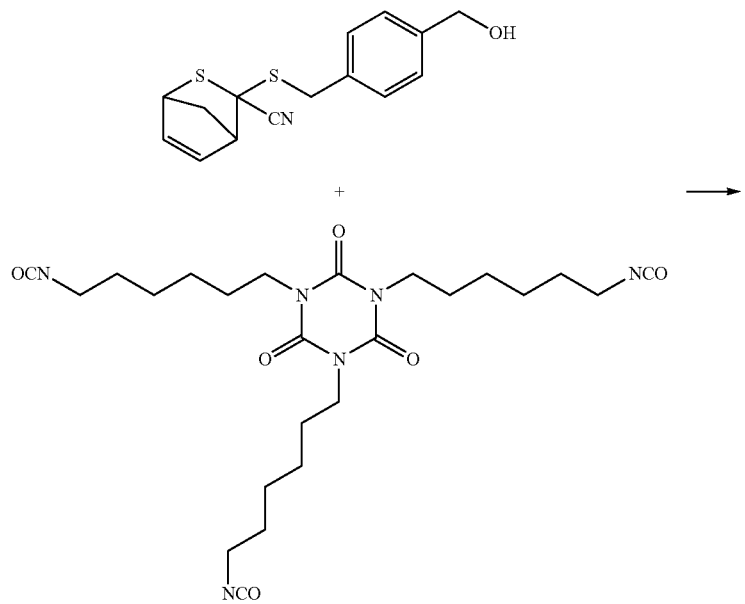

-continued

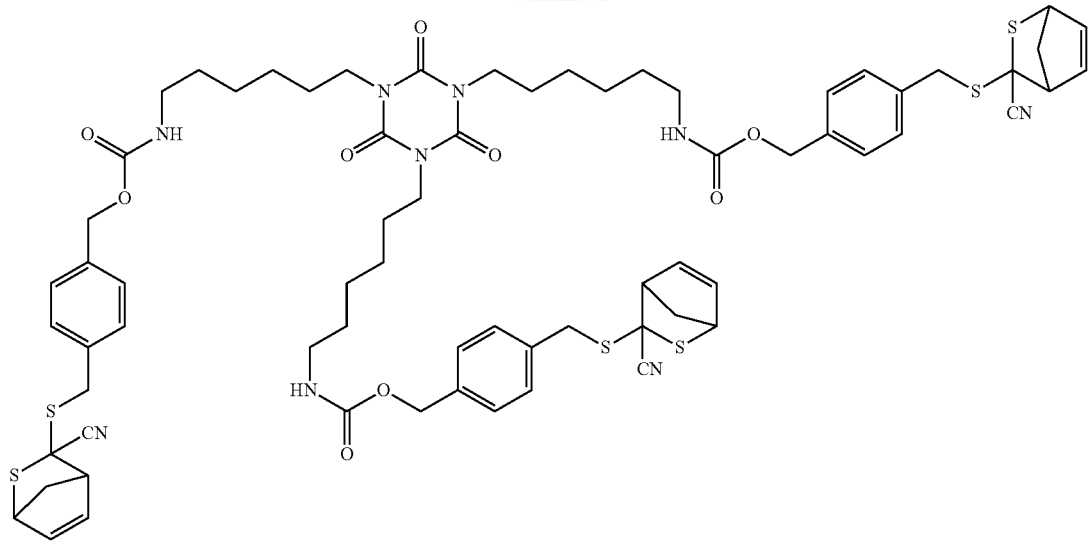

The selection of the compounds selected to form the protective groups is not confined to pure cyclopentadiene. All that is essential in accordance with the invention when selecting the protective groups is that they are amenable to reaction with a dithioester to give a protected compound, form a stable bond at room temperature, and are detachable again to a large extent, in other words to an extent of at least 80%—with reformation of the dithioester—at temperatures of around 80° C. or below 80° C. This reaction step takes place preferably at temperatures which lie above the boiling temperature of the protective reagent. In this way, the reliberated protective reagent can be removed from the system at the same time, and the crosslinking reaction can additionally be accelerated and taken to a higher conversion. In the case of cyclopentadiene, accordingly, this reaction step takes place preferably at temperatures above 40° C.

Examples of further compounds suitable as protective reagents are methylcyclo-pentadiene, tetramethyl-Cp, 1,3-cyclohexadienes, spiro[2.4]hepta-4,6-dienes and trimethylsilylcyclopentadienes.

Surprisingly it has been found that these systems are stable on storage at room temperature even in a formulation of components A and B. Activation takes place at an activating temperature $T_1$ which is at least 35° C. and is at least 5° C., preferably at least 10° C., below the decrosslinking temperature $T_2$. The temperature $T_1$ is preferably between 40 and 85° C., more preferably between 40 and 80° C. Crosslinking itself could in that case take place even at room temperature; in general it is carried out at the same temperature $T_1$.

The decrosslinking temperature $T_2$ in accordance with the invention is at least 5° C., preferably at least 10° C., above the activating temperature $T_1$. The decrosslinking temperature $T_2$ is preferably between 75 and 200° C., more preferably between 85 and 150° C.

Equally surprisingly it has been found that these networks can be turned back into a thermoplastic simply and virtually completely even at relatively low temperatures $T_2$, as specified above. Furthermore, it has been found, very surprisingly, that thereafter it is possible for renewed crosslinking to take place, without further addition of crosslinker and/or catalyst—by means of pure cooling, for example. A particularly surprising effect, furthermore, is that these cycles of crosslinking and return to a thermoplastic can be carried out at least three times, preferably at least five times, without substantial loss of properties on the part of the network.

Component B is a compound having at least two diene groups. These diene groups are familiar to the skilled person. Known examples include cyclopentadienyl groups, substituted cyclopentadienyl groups, or sorbyl groups.

In one embodiment component B is a difunctional polymer prepared by means of atom transfer radical polymerization (ATRP). In this case the functionalization with the diene groups may take place through a substitution of terminal halogen atoms that is carried out polymer-analogously or during termination. This substitution may be accomplished, for example, by addition of mercaptans functionalized with diene groups.

An exemplary polymerization reaction between a difunctional diene and a difunctional dienophile may look like that below. If at least one of the two components is employed in at least trifunctional form, a corresponding reversible crosslinking reaction occurs:

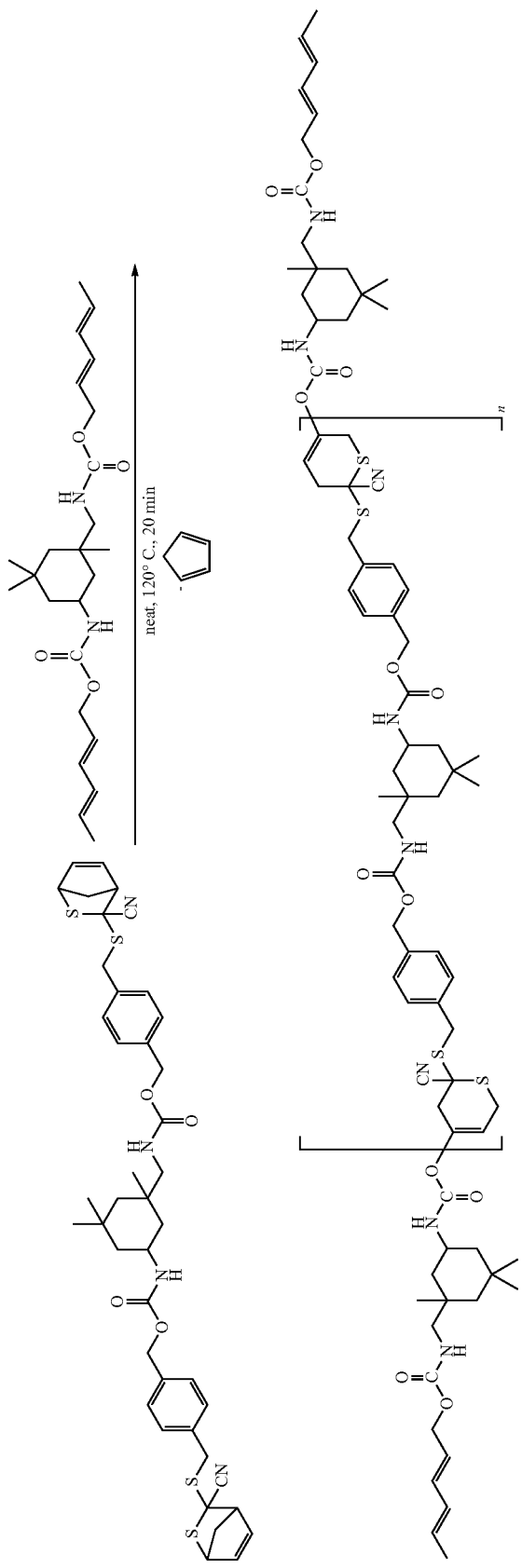

A further aspect of the present invention is the process for reversible crosslinking. When this process is implemented, a formulation composed of at least two different components A and B is activated and thereupon spontaneously crosslinked by means of a Diels-Alder reaction or hetero-Diels-Alder reaction, at the activating temperature $T_1$. In a second process step, at a higher temperature, at least 50%, preferably at least 90% and more preferably at least 99% of the crosslinks are undone again by means of a retro-Diels-Alder reaction or a retro-hetero-Diels-Alder reaction.

When this second process step is implemented, at the decrosslinking temperature $T_2$, at least 90%, preferably at least 95% and more preferably at least 98% by weight of the formulation becomes soluble again preferably within 5 minutes, not more than within 10 minutes, in a solvent suitable for the formulation prior to the crosslinking. The crosslinking beforehand was such that on 5-minute washing with the same solvent, not more than 5%, preferably not more than 2% and more preferably not more than 1% by weight of the formulation could be dissolved. The term "formulation" and all of the percentages associated with it relate in this case only to components A and B. Other formulating constituents, such as those, for example, which may be added in a coating or adhesive composition, are disregarded in this consideration. In the text below, the expression "formulation" in the context of this specification describes exclusively the components A and B and also an optional crosslinking catalyst. The expression "composition", in contrast, comprises components added additionally as well as the formulation. These additional components may be adjuvants selected specifically for the particular application, such as fillers, pigments, additives, compatibilizers, co-binders, plasticizers, impact modifiers, thickeners, defoamers, dispersing additives, rheology improvers, adhesion promoters, scratch resistance additives, catalysts or stabilizers, for example.

In a first alternative, in accordance with the formulation already described, components A and B, and also optional further adjuvants, are first combined in the process. This may be done directly prior to activation and subsequent crosslinking. In accordance with the invention, however, the advantageous process alternative exists in which all of the formulating ingredients are mixed and are not crosslinked until needed—even days or weeks later—by means of the activating temperature $T_1$.

The crosslinking reaction may take place at the activating temperature $T_1$ within 10 minutes, preferably within 5 minutes, more preferably within 2 minutes and very preferably within one minute.

In order to accelerate the crosslinking, it is possible to add a crosslinking catalyst after components A and B have been mixed, and preferably directly prior to activation. These crosslinking catalysts are, generally speaking, strong acids such as trifluoroacetic acid or sulphuric acid, or strong Lewis acids such as boron trifluoride, zinc dichloride, titanium dichloride diisopropoxide or aluminium trichloride, for example.

However, crosslinking also proceeds without a catalyst, by thermal means, for example, to a satisfactory extent. The activating temperature here, as described, is below the temperature required for the retro-(hetero)-Diels-Alder reaction. The embodiment without catalyst is preferred over the addition of a catalyst.

In one alternative embodiment, crosslinking may also be accelerated without a catalyst, by thermal means, for example. In that case the activating temperature, as described, is below the temperature required for the retro-(hetero)-Diels-Alder reaction.

In a further alternative embodiment, the formulation, independently of the activation of the crosslinking reaction, comprises a further catalyst that lowers the decrosslinking temperature $T_2$ of the retro-Diels-Alder or retro-hetero-Diels-Alder reaction. These catalysts may be, for example, iron or an iron compound. One possible disadvantage of such catalysts, however, is that they adversely affect the stability in storage of the formulation of components A and B, since such catalysts may simultaneously influence the activation, i.e. the removal of the protective groups.

The formulations and processes of the invention can be used in a wide variety of fields of application. The list below indicates certain preferred fields of application by way of example, without confining the invention in this respect in any form whatsoever. Such preferred fields of application are adhesives, sealants, moulding compounds, varnishes, paint, coatings, composite materials or inks.

These inks are, for example, compositions which are applied thermally and crosslink on the substrate. If conductive oligomers are used, or additives for generating conductivity in general, an electrically conducting ink is obtained which can be processed, for example, by bubble-jet methods.

Examples from the fields of application of varnishes, coatings and paint are compositions which in the decrosslinked state are able to wet porous materials, for example, to particularly good effect and which, following the crosslinking reaction, produce highly cohesive materials.

Similar characteristics are of importance for adhesives, which ought to have high cohesion and are nevertheless intended readily to wet the surfaces of the materials to be bonded.

A further application in the adhesive bonding area is, for example, a join which is needed only temporarily and must later be undone, of the kind that may occur in various production operations, for example in automotive engineering or in mechanical engineering.

Another conceivable application is the bonding of components which, viewed over the lifetime of the product as a whole, are highly likely to be replaced, and which therefore ought to be removable again very easily and without residue. One example of an application of this kind is the bonding of car windscreens.

One particular example of adhesives or sealants is their use in food packaging which opens or can be undone autonomically during heating, such as in a microwave, for example.

One example of applications in the rapid prototyping sector for the crosslinking and decrosslinking materials described here can be found in the area of FDM (fused deposition modelling) or in 3D printing by ink-jet methods with low-viscosity melts.

One example of applications in the area of composite materials are self-healing matrix materials or fibre composites that crosslink reversibly and can therefore be thermally reformed.

EXAMPLES

The weight-average molecular weights of the polymers are determined by means of GPC (gel permeation chromatography). The measurements were carried out using a PL-GPC 50 Plus from Polymer Laboratories Inc. at 30° C. in tetrahydrofuran (THF) against a series of polystyrene standards (approximately 200 to $1 \cdot 10^6$ g/mol).

Example 1

Synthesis of a Cyclopentadiene-Blocked Dicyanodithioester (IPDI-DTE-CP)

Stage 1a: Sodium Carbonocyanidodithioate (1a)

(1a)

A suspension of 5.46 g (0.111 mol, 1.1 eq) of sodium cyanide in 20 ml of DMF is cooled to 0° C. in an ice bath. With vigorous stirring, 6.20 ml (7.75 g, 0.102 mol, 1 eq) of carbon disulphide, diluted with 13 ml of DMF, are added over a period of 10 minutes. Following complete addition of $CS_2$, the ice bath is removed and the solution is stirred until solidification is complete (precipitation of brown needles over a period of approximately 60 minutes). Then 150 ml of isobutyl alcohol are added and heating takes place to dissolve the precipitated needles. The hot solution is filtered in order to remove unconsumed sodium cyanide. The filtrate is cooled with liquid nitrogen and the reformed precipitate is isolated by filtration and washed with diethylether. The brownish powder is recrystallized once from a 1:1 mixture of isobutyl alcohol and diethyl ether. This gives a yellow solid, with a yield of 90% (30.0 g, 0.09 mol).

Stage 1b: Tetraethylammonium Carbonocyanidodithioate (1b)

(1b)

The following conversion to the ammonium salt is necessary in order to increase the stability of the salt in storage. The corresponding sodium salt from stage 1, however, could also be used.

The entire yellow solid obtained is subsequently boiled at reflux in 110 ml of ethanol, while at the same time 18.9 g (0.09 mol, 1 eq) of ethylammonium bromide are boiled in 50 ml of ethanol. The two boiling solutions are combined and kept at boiling with reflux for a further 10 minutes. On cooling, a brown solid crystallizes out, and is filtered off and recrystallized from ethanol. The end product is a brown, lustrous solid. Yield: 48% (10.0 g, 0.043 mol)

Stage 2: 4-(Bromomethyl)benzyl alcohol (2)

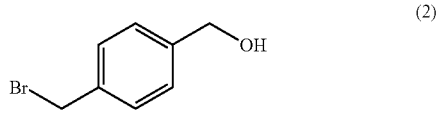

(2)

Under nitrogen, 50 ml of a 25% strength solution of diisobutyl aluminium hydride in hexane (8.17 g, 57.4 mmol, 2 eq) are cooled to 0° C. in an ice bath, and then 6.57 g (28.7 mmol, 1 eq) of methyl 4-(bromomethyl)benzoate, in solution in 30 ml of dichloromethane, are added via a dropping funnel over the course of 30 minutes. After a reaction time of 4 hours, water is slowly added in order to quench remaining diisobutylaluminium hydride. To dissolve the white precipitate which forms in the course of quenching, 30 ml of concentrated HCl solution and 30 ml of dichloromethane are added. The two phases are separated and the aqueous layer is extracted four times with dichloromethane. The organic phases are combined and dried using $Na_2SO_4$. Under reduced pressure, the solvent is removed; a white solid is left, in a yield of 77% (4.40 g, 22.0 mmol). The product was identified by $^1$H-NMR spectroscopy as the target product.

Stage 3: Cyclopentadiene-Blocked Cyanodithioester (3)

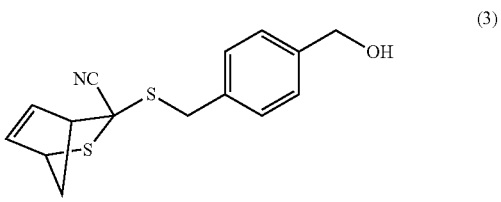 [SMILES: N#CC1(SCc2ccc(CO)cc2)SC2C=CC1C2]

(3)

In a round-bottomed flask, 4.40 g (22.0 mmol, 1 eq) of 4-(bromomethyl)benzyl alcohol from stage 2 are dissolved in 15 ml of acetonitrile and stirred at room temperature. Added to the solution are 5.22 g (22.5 mmol, 1.02 eq) of tetraethylammonium carbonocyanidodithioate from stage 1b, in solution in 2 ml of acetonitrile. After a reaction time of one minute, 5.22 ml (4.02 g, 60.9 mmol, 2.7 eq) of cyclopentadiene are injected and the mixture is stirred for 3 hours. The solvent is removed under reduced pressure and the yellow oil that remains is purified by means of flash chromatography (silica gel/1:1-1:2 hexane:ethyl acetate). The product was identified by means of $^1$H and $^{13}$C NMR spectroscopy as the target product. Yield: 32% (2.03 g, 7.04 mmol)

Stage 4: Cyclopentadiene-Blocked Cyanodithioester Di-Linker (IPDI-DTE-CP) (3a)

1.00 g (3.40 mmol, 2.3 eq) of cyclopentadiene-blocked cyanodithioester (3) from stage 3, 0.33 g (1.50 mmol, 1 eq) of isophorone diisocyanate (IPDI) and 1.00 g (0.0015 mmol, 0.01 eq) of dibutyltin dilaurate are introduced under a nitrogen atmosphere into a 25 ml two-necked flask, and subsequently admixed with 4 ml of dried THF. This mixture is heated to 55° C. with stirring and at that temperature 0.5 ml (0.362 g, 3.50 mmol, 2.3 eq) of triethylamine is added. The mixture is subsequently stirred at 55° C. overnight and then cooled to room temperature, before the THF is removed under reduced pressure.

The residue is dissolved in 40 ml of dichloromethane and the organic phase is washed in succession with 30 ml of 1-molar aqueous NaOH solution, 30 ml of 1-molar aqueous HCl solution, and with NaCl solution. The organic phase is dried over magnesium sulphate and then the solvent is removed under reduced pressure. This gives 1.40 g of a dark solid, which in turn is purified by chromatography over silica gel, using a 2:1 mixture of ethyl acetate and hexane as eluent. This gives a yield of 53% (0.70 g, 0.8 mmol). The product was identified as the target product by means of $^1$H NMR spectroscopy.

Example 2

Isophorone-Disorbyl (IPDI-SA) (4)

This compound, used in accordance with the invention as a diene, is synthesized from isophorone diisocyanate (IPDI) and sorbyl alcohol in acetone.

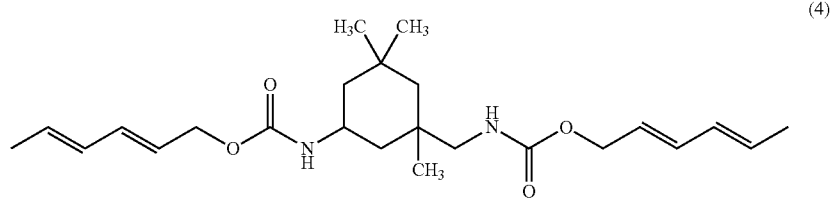 [SMILES: C/C=C/C=C/COC(=O)NCC1(C)CC(NC(=O)OC/C=C/C=C/C)CC(C)(C)C1]

(4)

For the synthesis, 1.092 mol (267.77 g) of IPDI are weighed out into a 2000 ml three-necked flask and then dissolved in 300 g of acetone. Following addition of 0.01% by weight of DBTL, the solution is heated to 60° C., and 2.377 mol (233.26 g) of furfuryl alcohol are added dropwise over the course of 60 minutes. The NCO content of the reaction solution at the beginning of the synthesis is 12.45%. After a reaction time of 4.5 hours, the NCO content is ascertained, in order to determine the progress of the reaction. It is 0.506%. A further hour later, the reaction is ended at an NCO content of 0.20%. The solvent is removed on a rotary evaporator at 100° C. and $5*10^{-1}$ mbar, leaving behind a brownish oil which is of very high viscosity at room temperature. Unambiguous characterization of the product took place by means of infrared spectroscopy and by means of $^1$H NMR and $^{13}$C NMR spectroscopy.

Example 3

Reaction of the IPDI-SA with the CP-Blocked Dienophile from Example 1

Equimolar amounts of the IPDI-SA diene from Example 2 and the CP-blocked dienophile from Example 1 (stage 4) are dissolved in dichloromethane and the two solutions are mixed with one another. The dichloromethane is subsequently removed in vacuo. The residue which remains is heated to 75° C. After a reaction time of 20-60 minutes, the heating source was removed and the resultant, cooled polymer was analyzed by means of GPC.

Example 4

Synthesis of Furfuryl-Functionalized Polymethacrylate (PMMA-FU) by Means of Free-Radical Solution Polymerization For the synthesis of the copolymer, a mixture of 60 parts by weight of n-butyl methacrylate, 20 parts of methyl methacrylate and 10 parts by weight of furfuryl methacrylate are dissolved in 35 parts by weight of xylene in a glass vessel, 4 parts by weight of mercaptoethanol are added, and degassing takes place by passing nitrogen through the vessel. In a further vessel, a 10% strength by weight solution of α,α'-azobis(2-hydroxyethylisobutyramide) (3 parts by weight) is prepared. The two initial charges are metered in a constant ratio over a period of five hours into a jacketed glass reactor with thermostat, temperature-conditioned to 110° C., under nitrogen, and are allowed to polymerize. After the end of the metering, heating is continued for an hour (110° C.) and the resultant polymer solution is cooled and discharged. A viscous, clear polymer solution is obtained, whose composition is ascertained by means of 1H NMR spectroscopy.

In this way, a diene component having more than two diene functionalities is obtained. This compound acts, accordingly, as a crosslinker.

Example 5

Reaction of the PMMA-FU with the CP-Blocked Dienophile from Example 1

Relative to the dienophile groups and to the furfuryl groups used in the polymerization of Example 4, equimolar amounts of the PMMA-FU from Example 4 and of the CP-blocked dienophile from Example 1 (stage 4) are dissolved in dichloromethane and the two solutions are mixed with one another. The dichloromethane is subsequently removed in vacuo. The residue which remains is heated to 75° C. After a reaction time of 20-60 minutes, the heating source was removed. An extraction test on the resultant solid using dichloromethane under reflux revealed that only 5% by weight of the material is still soluble. In contrast, an extraction with toluene under reflux and with subsequent filtration at approximately 95° C. revealed that about 85% by weight of the material was in solution again at 111° C. This experiment shows that there is no decrosslinking at a temperature of around 40° C., whereas at a temperature of 111° C. a large proportion of the crosslinking sites are undone again.

Example 6

Synthesis of CP-telechelic poly-n-butyl acrylate (PBA-CP)

This telechelic used as diene is a poly-n-butyl acrylate having two terminal cyclopentadiene groups in each case. The preparation process is a two-stage process.

Stage 1: Synthesis of Br-telechelic poly-n-butyl acrylate by means of ATRP 62 equivalents of n-butyl acrylate (nBA), 1 equivalent of 1,4-bis(bromoisobutyryl-oxy)butane, 0.35 equivalent of copper(I) oxide, 0.0125 equivalent of copper(II) bromide and 0.7 equivalent of pentamethyldiethylenetriamine (PMDETA) are introduced into a 1 l three-necked flask with magnetic stirrer, nitrogen inlet and reflux condenser. Acetone is added to the mixture in an amount sufficient to give 200 ml of a 50% strength (by volume) solution. Oxygen present is removed by the passage of nitrogen for 40 minutes. The mixture is thereafter heated to 60° C. under nitrogen in an oil bath. After polymerization for 1.5 hours, it is terminated by cooling to room temperature and admitting atmospheric oxygen. The copper catalyst is removed by electrochemical deposition on zinc dust in accordance with the method described in WO 2012/007213. The bromine-terminated poly(n-butyl acrylate) is recovered by evaporation of the solvent.

Stage 2: Synthesis of Cp-Telechelic Poly(nBA) (PnBA-CP)

1 equivalent of polymer from preceding stage 1, 6 equivalents of sodium iodide, 2 equivalents of triphenylphosphine and 2 equivalents of nickelocene are introduced into a 50 ml three-necked flask with magnetic stirrer, reflux condenser and dropping funnel, under nitrogen and in acetone, to form 25 ml of a solution having a molarity of 0.1 based on the polymer. The solution is stirred at room temperature for 12 hours, and the reaction solution is subsequently purified by column chromatography on a short column packed with basic aluminium oxide. The cyclopentadienyl-terminated polymer is precipitated twice from cold ethanol by addition of water. The conversion of the Br end groups to Cb end groups can be demonstrated by nuclear magnetic resonance spectroscopy. The molecular weight is determined by means of GPC with calibration against PMMA standards in THF.

Example 7

Reaction of the PnBA-CP with the CP-Blocked Dienophile from Example 1

Equimolar amounts of the PnBA-CP diene from Example 6 and of the CP-blocked dienophile from Example 1 (stage 4) are dissolved in dichloromethane and the two solutions are mixed with one another. The dichloromethane is subsequently removed in vacuo. The residue which remains is heated to 75° C. After a reaction time of 20-60 minutes, the heating source was removed and the resultant, cooled polymer was analysed by GPC (Example 7a) and compared with the molecular weight of the polymer from Example 6 (see Table 1). Given therein are the values for the number average ($M_n$) and for the peak maximum ($M_p$) of the molecular weight, and the molecular weight distribution (PDI).

The product is subsequently taken up in a solution of 10 equivalents of 2,3-dimethylbutadiene in toluene and is heated at 120° C. for 30 minutes. A GPC measurement is then performed on this product as well (see Example 7b in Table 1). The 2,3-dimethylbutadiene is needed here as a diene, in order to scavenge the free cyanodithiocarbonate groups of the decrosslinked dienophile. If this were not done, the cyanodithiocarbonates would react again on cooling with the diene groups of the compound from Example 6 (in accordance with the invention).

In a parallel experiment without 2,3-dimethylbutadiene and toluene, the mixture is heated to 120° C. Here it is found that a fluid composition is obtained from a pastelike material at this high temperature. This decrease in viscosity cannot be attributed solely to the lower viscosity of the polymer at higher temperatures, but instead more particularly to the retro-hetero-Diels-Alder reaction that occurs in accordance with the invention.

TABLE 1

| Example | $M_n$ g mol$^{-1}$ | $M_p$ g mol$^{-1}$ | PDI |
|---|---|---|---|
| Example 6 (PnBA-CP) | 12 300 | 11 100 | 1.4 |
| Example 1 (IPDI-DTE-CP) | 920 | 870 | 1.0 |
| Example 7a | 23 100 | 37 000 | 1.9 |
| Example 7b | 5 900 | 11 100 | 3.1 |

The invention claimed is:

1. A reversibly crosslinkable formulation crosslinkable via a hetero-Diels-Alder reaction, the formulation comprising a component A which has at least two protected dithioester groups, and a component B which has at least two diene functionalities.

2. The formulation according to claim 1, wherein the protected dithioester is a compound having the structure

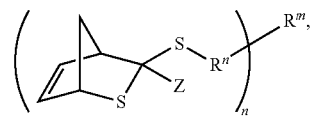

where Z is an electron-withdrawing group, $R^m$ is a plurivalent organic group or a polymer, the group $R^n$ is a divalent alkylic, aromatic or oligoethereal group, and n is a number between 2 and 20.

3. The formulation according to claim 2, wherein the group Z is a cyano group.

4. The formulation according to claim 2, wherein the group $R^n$ is a benzyl group and n is a whole number between 2 and 4.

5. The formulation according to claim 1, wherein components A and/or B comprise a polymer.

6. The formulation according to claim 5, wherein the polymers are polyacrylates, polymethacrylates, polystyrenes, copolymers of acrylates, methacrylates and/or styrenes, polyacrylonitrile, polyethers, polyesters, polylactic acids, polyamides, polyesteramides, polyurethanes, polycarbonates, amorphous or semicrystalline poly-α-olefins, EPDM, EPM, hydrogenated or unhydrogenated polybutadienes, ABS, SBR, polysiloxanes and/or block, comb and/or star copolymers of these polymers.

7. The formulation according to claim 1, wherein at least one of the two components, A or B, has at least three of the respectively stated functionalities.

8. The formulation according to claim 1, wherein component A is a low molecular mass organic compound having 3 to 4 protected dithioester groups, and in that the formulation can be activated at a temperature $T_1$ between 35 and 70° C. and is thereby crosslinkable and the crosslinking can be reversed to an extent of at least 50% at a temperature $T_2$ which is at least 5° C. higher than the temperature $T_1$.

9. A process for reversible crosslinking, comprising:
activating a formulation according to claim 1 at a temperature $T_1$ of at least 35° C.;
subsequently crosslinking the formulation via a hetero-Diels-Alder reaction; and at a temperature $T_2$ which is at least 5° C. higher than the temperature $T_1$, undoing at least 50% of the crosslinks via a retro-hetero-Diels-Alder reaction.

10. The process according to claim 9, wherein the temperature $T_1$ is a temperature between 40 and 80° C. and the temperature $T_2$ is a temperature between 85 and 150° C.

11. The process according to claim 9, wherein at a temperature above 80° C., at least 90% of the formulation is soluble again in a solvent suitable for the formulation prior to the crosslinking.

12. The process according to claim 9, wherein the crosslinking of the formulation comprising components A and B, on heating to the temperature $T_1$, takes place within 5 minutes.

13. An adhesive, sealant, molding compound, varnish, paint, coating, ink, or composite material, comprising the formulation according to claim 1.

* * * * *